US012091292B2

(12) United States Patent
Jaeger (10) Patent No.: US 12,091,292 B2
(45) Date of Patent: Sep. 17, 2024

(54) BOOM ASSEMBLY EQUIPPED WITH AN EXTENDABLE WINCH ASSEMBLY

(71) Applicant: David A. Jaeger, Oregon, OH (US)

(72) Inventor: David A. Jaeger, Oregon, OH (US)

(*) Notice: Subject to any disclaimer, the term of this patent is extended or adjusted under 35 U.S.C. 154(b) by 312 days.

(21) Appl. No.: 17/508,138

(22) Filed: Oct. 22, 2021

(65) Prior Publication Data

US 2022/0274811 A1    Sep. 1, 2022

Related U.S. Application Data

(60) Provisional application No. 63/154,212, filed on Feb. 26, 2021.

(51) Int. Cl.
| | |
|---|---|
| *B60P 1/54* | (2006.01) |
| *B60P 3/12* | (2006.01) |
| *B63B 27/10* | (2006.01) |
| *B66C 23/42* | (2006.01) |
| *B66C 23/70* | (2006.01) |
| *B64D 9/00* | (2006.01) |
| *B66C 23/20* | (2006.01) |

(52) U.S. Cl.
CPC .......... *B66C 23/707* (2013.01); *B60P 1/5433* (2013.01); *B60P 3/125* (2013.01); *B66C 23/42* (2013.01); *B63B 27/10* (2013.01); *B64D 9/00* (2013.01); *B66C 23/20* (2013.01)

(58) Field of Classification Search
CPC ..... B66C 23/04; B66C 23/701; B66C 23/702; B66C 23/703; B66C 23/704; B66C 23/705; B66C 23/706; B66C 23/707; B66C 23/04708

See application file for complete search history.

(56) References Cited

U.S. PATENT DOCUMENTS

| | | | |
|---|---|---|---|
| 4,573,857 A | 3/1986 | Porter, Sr. et al. | |
| 6,126,378 A | 10/2000 | Landoll et al. | |
| 7,465,144 B1 | 12/2008 | Studer | |
| 7,819,348 B2 | 10/2010 | Bouwers et al. | |
| 10,640,344 B1 * | 5/2020 | Hall | B66D 1/38 |
| 2011/0123304 A1 | 5/2011 | Thomas et al. | |

(Continued)

FOREIGN PATENT DOCUMENTS

| | | | | |
|---|---|---|---|---|
| CN | 110386540 A | * | 10/2019 | |
| DE | 4119289 A | * | 1/1992 | B66C 1/442 |

(Continued)

*Primary Examiner* — Saul Rodriguez
*Assistant Examiner* — Lucia Elba Rodriguez
(74) *Attorney, Agent, or Firm* — C. Fred Charpie, III; Ward Law Office LLC (57) ABSTRACT

A boom assembly includes a boom housing having a longitudinal, internal cavity. A telescoping boom moves in an axial direction relative to the boom housing and has a first end positioned within the longitudinal, internal cavity and a second end positioned outside the longitudinal, internal cavity. A winch assembly moves with the movement of the telescoping boom. A winch cable extends from the winch assembly and is guided by a pulley. A portion of the winch cable extends over the pulley in an outward direction from the pulley. The extending portion of the winch cable has a length, and the length of the extending portion of the winch cable remains the same regardless of the axial movement of the telescoping boom relative to the boom housing.

20 Claims, 4 Drawing Sheets

(56) References Cited

U.S. PATENT DOCUMENTS

| | | | |
|---|---|---|---|
| 2011/0147329 A1 | 6/2011 | Evans et al. | |
| 2015/0273252 A1 | 10/2015 | Lenz, Jr. et al. | |
| 2018/0118081 A1* | 5/2018 | Jaeger | B66C 23/44 |
| 2019/0031072 A1 | 1/2019 | Marchlewski et al. | |

FOREIGN PATENT DOCUMENTS

| | | | | |
|---|---|---|---|---|
| KR | 20130028557 A | * | 9/2011 | |
| RU | 00042013 | | 11/2004 | |
| RU | 2566172 C1 | * | 10/2015 | B66C 23/42 |
| RU | 162251 U1 | * | 5/2016 | |
| SU | 00278064 | | 11/1969 | |
| WO | WO-2018115271 A1 | * | 6/2018 | B66C 23/16 |

* cited by examiner

BOOM ASSEMBLY EQUIPPED WITH AN EXTENDABLE WINCH ASSEMBLY

RELATED APPLICATIONS

This application claims the benefit of U.S. provisional patent application No. 63/154,212, filed Feb. 26, 2021, the disclosure of which is incorporated herein by reference in its entirety.

BACKGROUND

Certain structures, vehicles, vessels and aircraft are used to move heavy loads. Structures, such as the non-limiting example of cranes, can be used to move heavy loads such as the non-limiting examples building structures, building components, air conditioning and heating units, concrete buckets and the like. Vehicles, such as the non-limiting example of tow trucks can be used to move heavy loads such as the non-limiting example of recovering disabled, improperly parked, impounded, indisposed or otherwise distressed motor vehicles. This may involve recovering a vehicle damaged in an accident, returning the vehicle to a drivable surface or towing or transporting the vehicle to a repair shop or other location.

Marine vessels, such as the non-limiting example of a tug, can be used to move heavy loads from one location to another, such as the non-limiting examples of machinery, equipment and supplies moved within the interior of the vessel and/or machinery, equipment and supplies moved from a vessel to onshore facilities and/or vice versa. Aircraft, such as the non-limiting example of a cargo plane, can be used to move heavy loads from one location to another, such as the non-limiting examples of machinery, equipment and supplies moved within the interior of the aircraft and/or machinery, equipment and supplies moved from an aircraft to runway facilities and/or vice versa.

Conventional boom assemblies typically involve a frame supporting a boom support and an extendable boom. The boom support and the extendable boom can be rotated to achieve a desired direction. The extendable boom can extend from the boom support. A winch assembly is connected to the boom support or to the frame and a winch cable extends from the winch assembly. A hook is typically connected to an outbound end of the winch cable. In the event the extendable boom is extended from the boom support, it is necessary to also simultaneously increase the length of the winch cable to prevent interference between the hook and the outbound end of the extendable boom.

It would be advantageous if boom assemblies could be improved to make them more convenient to use.

SUMMARY

It should be appreciated that this summary is provided to introduce a selection of concepts in a simplified form, the concepts being further described below in the Detailed Description. This Summary is not intended to identify key features or essential features of this disclosure, nor is it intended to limit the scope of the boom assembly equipped with an extendable winch assembly.

The above objects as well as other objects not specifically enumerated are achieved by a boom assembly. The boom assembly includes a boom housing having a longitudinal, internal cavity. A telescoping boom is configured for axial movement relative to the boom housing and has a first end and an opposing second end. The first end is positioned within the longitudinal, internal cavity of the boom housing and the second end positioned outside the longitudinal, internal cavity of the boom housing. A winch assembly is connected to the telescoping boom and configured for axial movement relative to the boom housing in connection with axial movement of the telescoping boom. A winch cable is connected to and extends from the winch assembly and a pulley is connected to the second end of the telescoping boom and configured to guide a first portion of the winch cable extending from the winch assembly and is further configured to support a second portion of the winch cable extending over the pulley in an outward direction from the pulley. The second portion of the winch cable extending in an outward direction from the pulley has a length, and the length of the second portion of the winch cable extending in an outward direction from the pulley remains the same regardless of the axial movement of the telescoping boom relative to the boom housing.

The above objects as well as other objects not specifically enumerated are also achieved by a method of operating a boom assembly. The method includes the steps of extending a boom housing from a structure, vehicle, vessel or aircraft, the boom housing having a longitudinal, internal cavity, positioning a first end of a telescoping boom within the longitudinal, internal cavity and positioning an opposing second end outside the longitudinal, internal cavity, the telescoping boom configured for axial movement relative to the boom housing, connecting a winch assembly to the telescoping boom and configuring the winch assembly for axial movement relative to the boom housing in connection with axial movement of the telescoping boom, connecting a first end of the winch cable to the winch assembly, connecting a pulley to the second end of the telescoping boom and extending a second end of the winch cable over the pulley, the pulley configured to guide the winch cable extending from the winch assembly and further configured to support a portion of the winch cable extending over the pulley and in an outward direction from the pulley, the portion of the winch cable extending in an outward direction from the pulley has a length, and wherein the length of the portion of the winch cable extending in an outward direction from the pulley remaining the same regardless of the axial movement of the telescoping boom relative to the boom housing.

Various objects and advantages of the boom assembly equipped with an extendable winch assembly will become apparent to those skilled in the art from the following Detailed Description, when read in light of the accompanying drawings.

DETAILED DESCRIPTION

The boom assembly equipped with an extendable winch assembly will now be described with occasional reference to specific embodiments. The boom assembly equipped with an extendable winch assembly may, however, be embodied in different forms and should not be construed as limited to the embodiments set forth herein. Rather, these embodiments are provided so that this disclosure will be thorough and complete, and will fully convey the scope of the boom assembly equipped with an extendable winch assembly to those skilled in the art.

Unless otherwise defined, all technical and scientific terms used herein have the same meaning as commonly understood by one of ordinary skill in the art to which the boom assembly equipped with an extendable winch assembly belongs. The terminology used in the description of the boom assembly equipped with an extendable winch assembly is for describing particular embodiments only and is not intended to be limiting of the boom assembly equipped with an extendable winch assembly. As used in the description of the boom assembly equipped with an extendable winch assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the boom assembly equipped with an extendable winch assembly. Notwithstanding that the numerical ranges and parameters setting forth the broad scope of the boom assembly equipped with an extendable winch assembly are approximations, the numerical values set forth in the specific examples are reported as precisely as possible. Any numerical values, however, inherently contain certain errors necessarily resulting from error found in their respective measurements.

The description and figures disclose a boom assembly equipped with an extendable winch assembly. The extendable winch assembly is configured to move in an outward direction with the outward movement of the boom assembly. A winch cable extends from the winch assembly and also moves in an outward direction with outward movement of the winch assembly. Accordingly, a length of the winch cable extending from a hook advantageously remains the same regardless of the length of the extension of the boom assembly.

Figure 1:
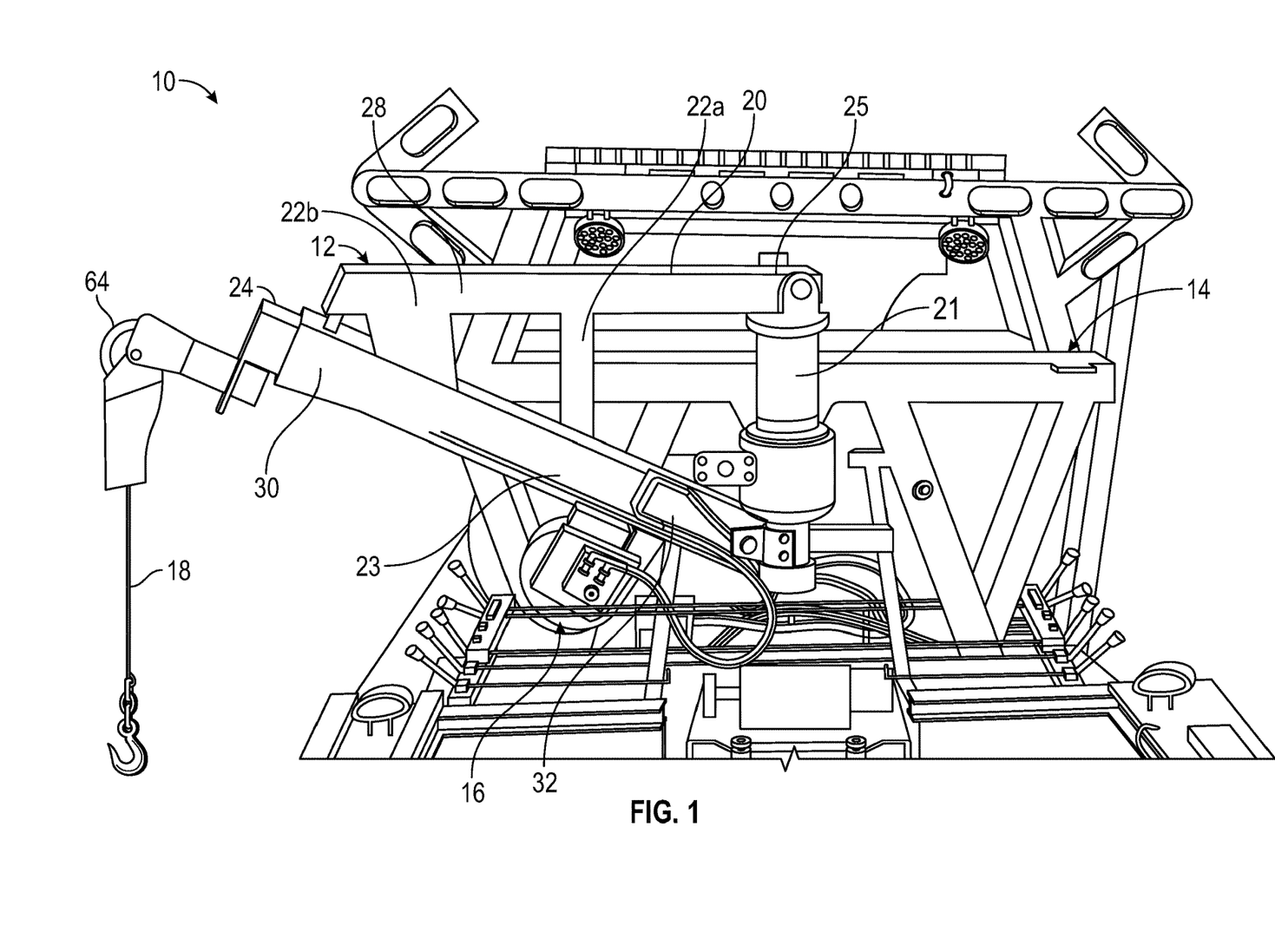
FIG. 1 is a perspective rear view of a vehicle equipped with a novel boom assembly equipped with an extendable winch assembly in accordance with the invention.
Figure 2:
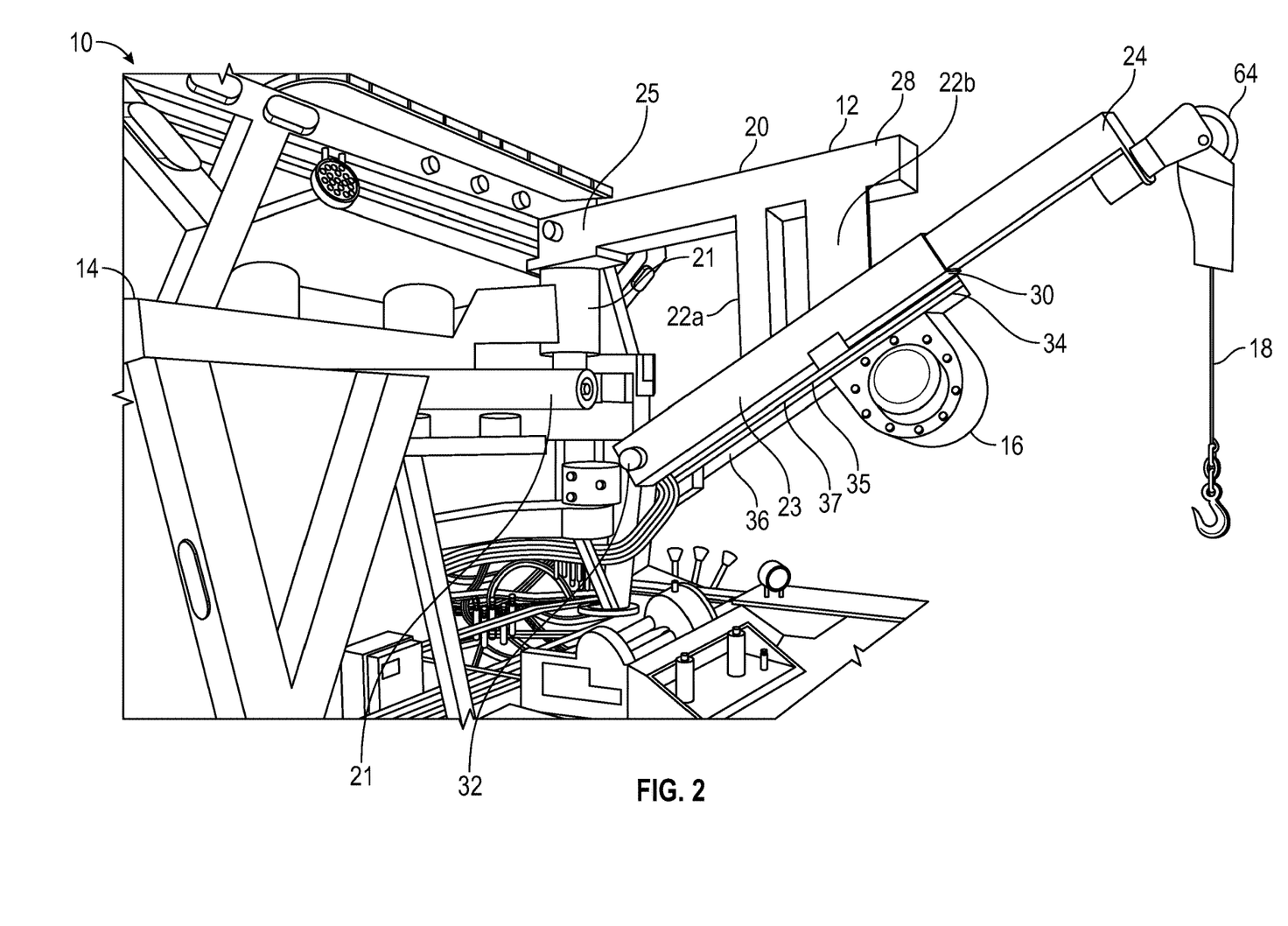
FIG. 2 perspective rear side view of the vehicle of FIG. 1.

Referring now to FIGS. 1 and 2, a portion of a tow truck having a boom assembly equipped with an extendable winch assembly is shown generally at 10. While FIGS. 1 and 2 illustrate the use of the boom assembly equipped with an extendable winch assembly in connection with a tow truck, it should be appreciated that the boom assembly equipped with an extendable winch assembly is configured for use with any structure, vehicle, vessel or aircraft configured to move heavy loads. Non-limiting examples of structures, vehicles, vessels and aircraft configured to move heavy loads include cranes, boom trucks, car carriers, tow trucks, fire trucks, ocean and lake freighters, tugboats, cargo planes and the like.

Referring again to FIGS. 1 and 2, the tow truck 10 includes a cab supported by a chassis (neither the cab nor the chassis are shown for purposes of clarity), a swing arm assembly 12, a support assembly 14, a winch assembly 16 and one or more winch cables 18.

Referring again to FIGS. 1 and 2, the cab is an enclosed space typically housing a seated driver (not shown) and an engine (not shown). The cab can include one or more doors and can have one or more seating areas. The cab and the engine are conventional in the art.

Referring again to FIGS. 1 and 2, the chassis (not shown) typically includes a frame (not shown) configured to support front and rear axles, front and rear wheels, the swing arm assembly 12 and the support assembly 14. Typically, the frame is formed from structural metallic components, such as for example, square tubing, angles, channels and the like. However, the frame can be formed from other materials and components. The chassis and the frame are also conventional in the art.

Referring again to FIGS. 1 and 2, the swing arm assembly 12 is rotatably attached to the support assembly 14 and is orientated in a generally vertical plane. The support assembly 14 is attached to, and supported by, the chassis. The support assembly 14 is configured to rigidly support the swing arm assembly 12 during operations to secure a heavy load, such as for example, a distressed vehicle, in a manner such that the swing arm assembly 12 maintains its orientation in the generally vertical plane. The support assembly 14 can have any desired arrangement of horizontal, vertical and inclined members, sufficient for the functions described herein.

Referring again to FIGS. 1 and 2, the support assembly 14 includes a bearing structure 21. The bearing structure 21 is configured to support rotational movement of the swing arm assembly 12 and is further configured to structurally support the swing arm assembly 12 during operations to move a heavy load. The bearing structure 21 can have any desired mechanisms, devices and structures sufficient to support rotational movement of the swing arm assembly 12 structurally support the swing arm assembly 12 during operations to move the heavy load.

Referring again to FIGS. 1 and 2, the swing arm assembly 12 includes a top support 20, an intermediate support 22a, an outboard support 22b, a boom housing 23 and a telescoping boom 24.

Referring again to FIGS. 1 and 2, a first end 25 of the top support 20 connects to the bearing structure 21. An opposing second end 28 of the top support 20 is connected to the intermediate support 22b. The top support 20 is configured for several functions. First, the top support 22, in combination with the boom housing 23, is configured to convey rotational movement from the bearing structure 21 to the telescoping boom 24. The top support 22 is further configured to provide structural support to the swing arm assembly 12 during operations to move the heavy load. In the illustrated embodiment, the top support 22 is formed from a structural metallic material, such as the non-limiting example of 4.0 inch×4.0 inch structural steel beam. However, in other embodiments, the top support 22 can be formed from other desired materials sufficient for the functions described herein.

Referring again to FIGS. 1 and 2, the intermediate support 22a extends from the top support 22 and connects to the boom housing 23. The intermediate support 22a is configured as a compression member, thereby supporting the swing arm assembly 12 for compressive forces incurred during operations to move a heavy load. In the illustrated embodiment, the intermediate support 22a is formed from a structural metallic material, such as the non-limiting example of 4.0 inch×4.0 inch structural steel beam. However, in other embodiments, the intermediate support 22a can be formed from other desired materials sufficient for the functions described herein.

Referring again to FIGS. 1 and 2, the outboard support 22b connects the second end 28 of the top support 20 with an outboard end 30 of the boom housing 23. The outboard support 22b, in combination with the boom housing 23, is configured to support the top support 20 and the telescoping boom 24 during rotational movement of the swing arm assembly 12 and operations to move a heavy load. In the illustrated embodiment, the outboard support 22b has the form of opposing structural plates. However, in other embodiments, the outboard support 22b can have other forms sufficient to support the top support 20 and the telescoping boom 24 during rotational movement of the swing arm assembly 12 and operations to move a heavy load.

Referring again to FIGS. 1 and 2, an inboard end 32 of the boom housing 23 connects to the bearing structure 21. In the illustrated embodiment, the boom housing 23 has a generally square cross-sectional shape and is a hollow structure forming an internal cavity 35 that extends from the outboard end 30 to the inboard end 32. In alternate embodiments, the boom housing 23 can have other cross-sectional shapes and can have other configurations sufficient for the functions described herein. The internal cavity 35 is configured to receive the telescoping boom 24.

Referring again to FIGS. 1 and 2, the boom housing 23 includes a lower side 36. The lower side 36 includes a longitudinal slot 37 that extends from the outboard end 30 to the inboard end 32. The longitudinal slot 37 is configured as a guide for the winch assembly 16 as the winch assembly 16 moves in an axial, outward direction with the axial, outward movement of the telescoping boom 24.

Figure 3:
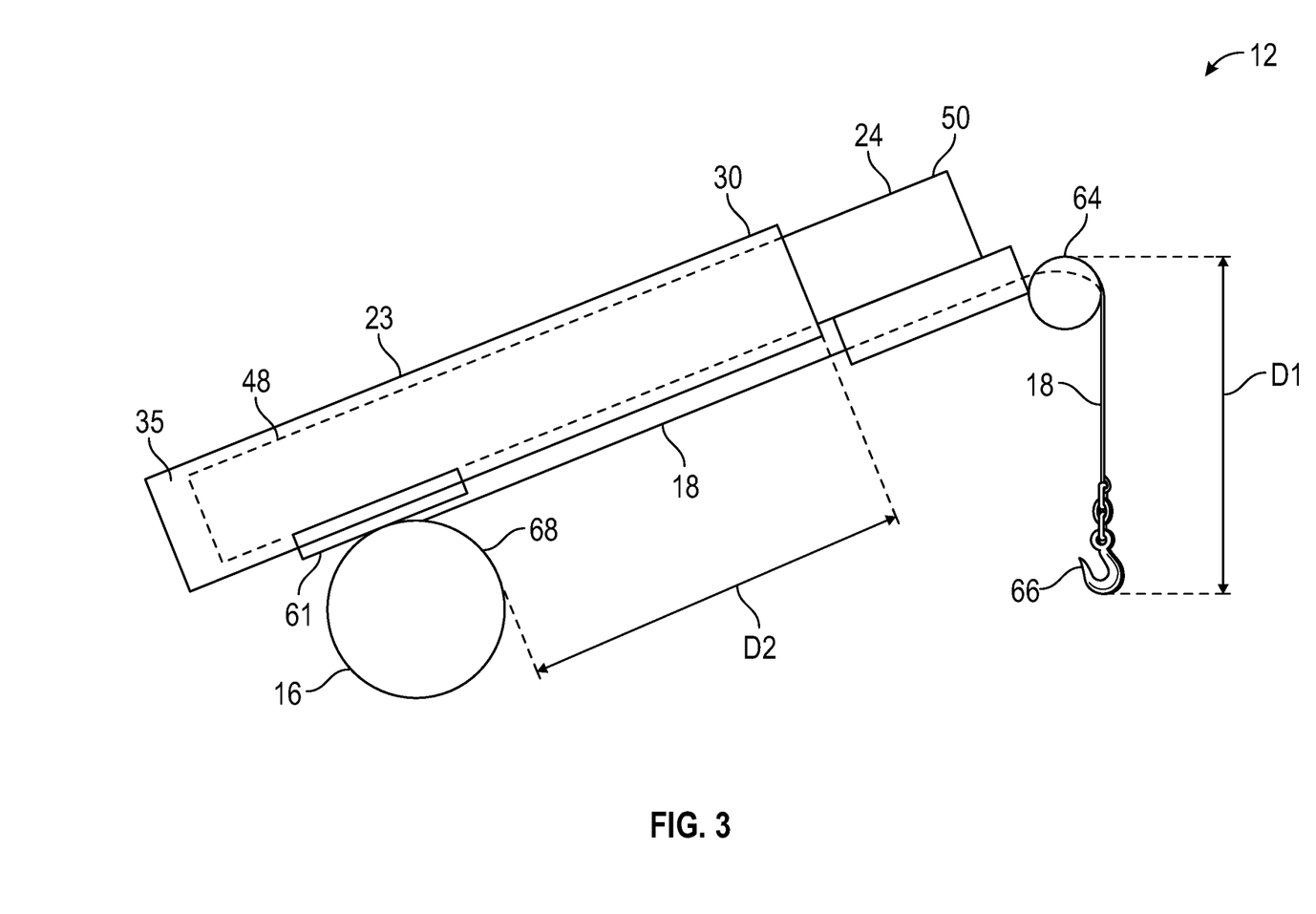
FIG. 3 is a schematic illustration of the boom assembly of FIG. 1, shown in a first, retracted orientation.

Referring now to FIG. 3, a schematic illustration of a portion of the swing arm assembly 12 is illustrated. The illustrated portion of the swing arm assembly 12 includes the winch cable 18, the boom housing 23, the telescoping boom 24, the winch 16, a coupler 61 and a pulley 64. The telescoping boom 24, the coupler 61 and the attached winch 16 are supported for axial, telescoping movement by the boom housing 23 as guided by the longitudinal slot 37. The telescoping boom 24 is supported within the cavity 35 formed by the boom housing 23. The inboard end 32 of the boom housing 23 is attached to the bearing structure (not shown for purposes of clarity) and is configured for rotation about the bearing structure. The outboard end 30 receives the telescoping boom 24 and supports the telescoping boom 24 for axial, telescoping movement. The telescoping boom 24 includes a first end 48 and an opposing second end 50.

Referring again to FIG. 3, the winch assembly 16 includes a coupler element 61. The coupler element 61 is configured to connect the winch assembly 16 to the telescoping boom 24 and further configured to ride within the longitudinal slot 37 of the boom housing 23, thereby guiding the winch assembly 16 as the telescoping boom 24 travels in axial, telescoping movement. In the illustrated embodiment, the coupler element 61 has the form of a metallic block. However, in other embodiments, the coupler element 61 can have other forms sufficient to connect the winch assembly 16 to the telescoping boom 24 and ride within the longitudinal slot 37 of the boom housing 23 to guide the winch assembly 16 as the telescoping boom 24 travels in axial, telescoping movement.

Referring again to FIG. 3, the winch 60 is a mechanical device used to pull in (wind up) or let out (wind out) or otherwise adjust "tension" in a winch cable 18. In the illustrated embodiment, the winch 60 includes a spool (not shown and also called a winch drum) attached to a driver (not shown). The driver is configured to rotate the spool and can be powered by electric, hydraulic, pneumatic or internal combustion devices. In certain embodiments, the winch 60 may include a brake mechanism configured to prevent the spool from rotating. As will be explained in more detail below, the winch 60 and the coupler 61 are configured to move in an axial direction with telescoping boom 24.

Referring again to FIG. 3, the winch cable 18 extends from the winch 60 to the pulley 64 and around the pulley 64 to a hook 66. The winch cable 18 is configured for attachment to the heavy load and is further configured to urge the heavy load in a direction toward the winch assembly 16 as the winch cable 18 is wound around the spool. In the illustrated embodiment, the winch cable 18 has the form of a wire rope. However, in other embodiments, the winch cable 18 can have other forms, including the non-limiting example of a flat cable sufficient to attach to the heavy load and urge the heavy load in a direction toward the winch assembly 16.

Referring again to FIG. 3, the hook 66 is connected to an outward end of the winch cable 18 and is configured for attachment to the heavy load. In the illustrated embodiment, the hook 66 has the form of a safety hook equipped with a locking latch. However, other hooks sufficient for connection to the winch cable 16 and attachment to the heavy load can be used. The hook 66 forms a distance D1 from the pulley 64. The distance D1 will be discussed in more detail below.

Referring again to FIG. 3, the telescoping boom 24 is shown in a first, retracted orientation. In the first, retracted orientation, the majority of the telescoping boom 24 is seated within the boom housing 23. In the first, retracted orientation, a leading edge 68 of the winch 60 forms a distance D2 with the outboard end 30 of the boom housing 23. The distance D2 will be discussed in more detail below.

Figure 4:
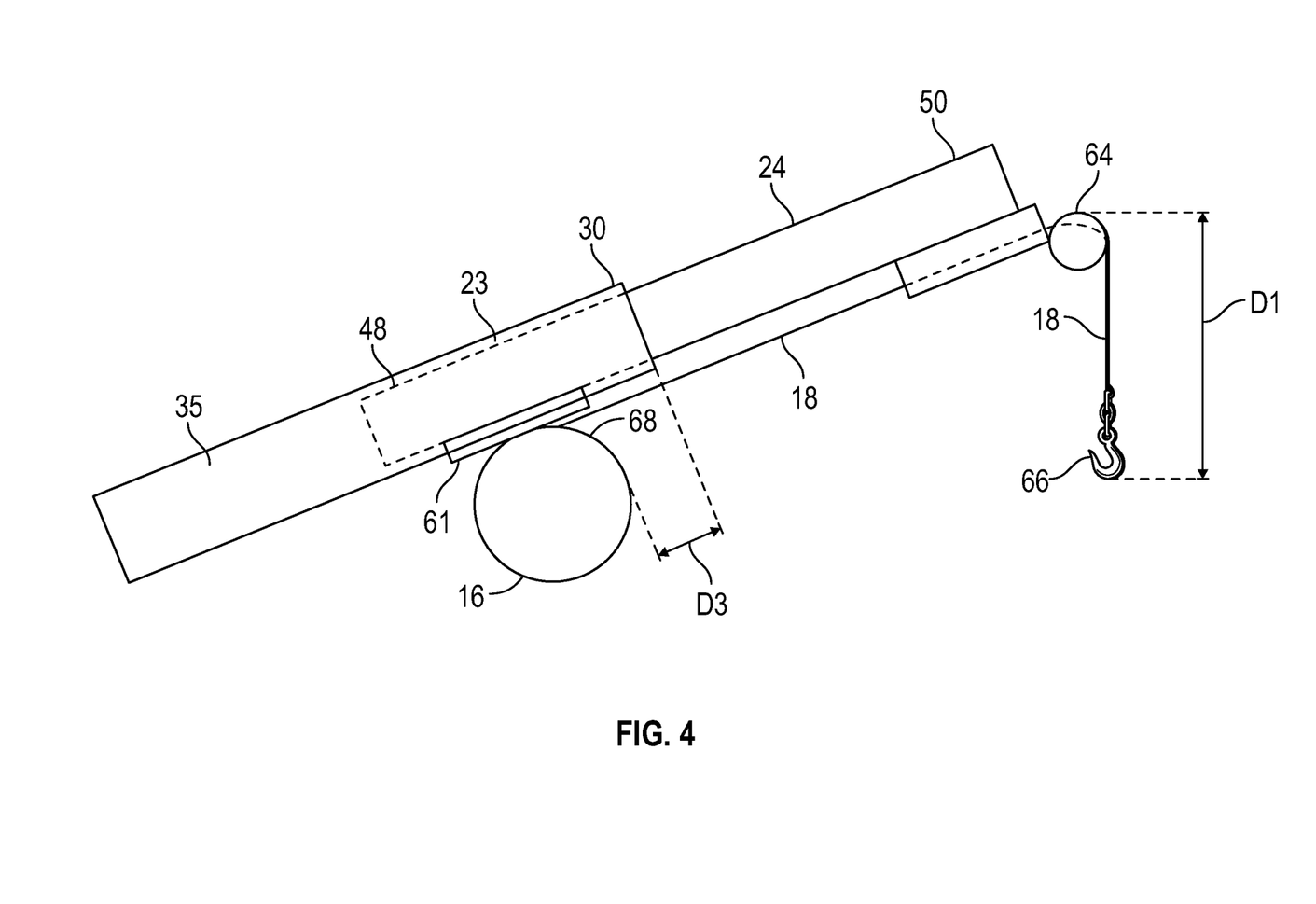
FIG. 4 is a schematic illustration of the boom assembly of FIG. 1, shown in a second, extended orientation.

Referring now to FIG. 4, a schematic illustration of the telescoping boom 24 is illustrated in a second, extended orientation. In the second, extended orientation, the first end 48 of the telescoping boom 24 has been moved in an outward, axial direction toward the outboard end 30 of the boom housing 23. Since the winch assembly 16 is connected to the telescoping boom 24 by way of the coupler element 61, movement of the first end 48 of the telescoping boom 24 in an outward, axial direction toward the outboard end 30 of the boom housing 23 results in corresponding movement of the winch assembly 16 and the coupler element 61 in the same direction.

Referring again to FIG. 4, the winch cable 18 extends from the pulley 64 to the hook 66. Since the winch assembly 60 moves in a corresponding manner with movement of the telescoping boom 24, extension of the telescoping boom 24 in an outward, axial direction advantageously results in the hook 66 maintaining the distance D1 from the pulley 64.

Referring again to FIG. 4, the telescoping boom 24 is illustrated in the second, extended orientation within the boom housing 23. In the second, extended orientation, the leading edge 68 of the winch 60 forms a distance D3 with the outboard end 30 of the boom housing 23. The distance D3 of the second, extended orientation is less than the distance D2 of the first, retracted orientation. Advantageously, while the telescoping boom 24 is extended, the distance D1 remains the same. The result of maintaining the same distance D1 means an operator need not be concerned with adjusting the length of the winch cable 18 as the telescoping boom 24 is moved from the first, retracted orientation to the second, extended orientation or from the second, extended orientation back to the first, retracted orientation. As is known with conventional boom assemblies, an adjustment of the length of the winch cable is necessary to avoid damage to objects connected to the hook 66.

Referring now to the embodiment shown in FIGS. 1-4, the telescoping boom 24 is moved from the first, retracted orientation to the second, extended orientation and back again by hydraulic structures, mechanisms and devices (not shown for purposes of clarity), such as for example hydraulic pistons, hoses, pumps and controls. However, it is contemplated that in other embodiments, the telescoping boom 24 can moved from the first, retracted orientation to the second, extended orientation and back again by other structures, mechanisms and devices, such as the non-limiting examples of electrical and pneumatic structures, mechanisms and devices.

Referring now to the embodiment shown in FIGS. 1-4, the winch assembly 16 is connected to an underside of the telescoping boom 24. However, it is contemplated that in other embodiments, the winch assembly 16 can be connected to other portions of the telescoping boom 12, including the non-limiting example of an upper portion of the telescoping boom 12.

Referring again to embodiments shown in FIGS. 1-4, a lone winch assembly 16 is illustrated. However, it is contemplated that in other embodiments, a plurality of winch assemblies can be attached to the telescoping boom and used in the same manner as described above.

The principle and mode of operation of the boom assembly equipped with an extendable winch assembly have been described in certain embodiments. However, it should be noted that the boom assembly equipped with an extendable winch assembly may be practiced otherwise than as specifically illustrated and described without departing from its scope.

What is claimed is:

1. A boom assembly comprising:
    a boom housing having a plurality of sides, the plurality of sides cooperating to define a longitudinal, internal cavity, the boom housing have an inboard end and an opposing outboard end;
    a longitudinal slot formed in one of the plurality of sides of the boom housing, the longitudinal slot extending from the inboard end to the opposing outboard end of the boom housing and fluidly connecting the longitudinal, internal cavity with exterior space;
    a telescoping boom configured for axial movement relative to the boom housing and having a first end and an opposing second end, the first end positioned within the longitudinal, internal cavity defined by the plurality of sides of the boom housing and the second end positioned outside the longitudinal, internal cavity defined by the plurality of sides of the boom housing;
    a winch assembly having a connecting portion extending through the longitudinal slot and attached to the telescoping boom, the winch assembly configured for axial movement relative to the boom housing in connection with axial movement of the telescoping boom, the axial movement of the winch assembly guided by the longitudinal slot;
    a winch cable connected to and extending from the winch assembly, the winch cable having a first portion extending from the winch assembly and arranged in a parallel orientation with the telescoping boom and a second portion; and
    a pulley, separated and distinct from the winch assembly, is fixed to the second end of the telescoping boom and configured to receive the first portion of the winch cable extending from the winch assembly and further configured to support the second portion of the winch cable extending over the pulley and in a direction away from the telescoping boom, wherein the second portion of the winch cable extending in an outward direction from the pulley has a length, and wherein the length of the second portion of the winch cable extending in an outward direction from the pulley remains the same regardless of the axial movement of the telescoping boom relative to the boom housing.

2. The boom assembly of claim 1, wherein the boom housing forms a portion of a swing arm assembly, the swing arm assembly configured for rotation about a bearing structure.

3. The boom assembly of claim 2, wherein the swing arm assembly includes a top support, the boom housing and a plurality of intermediate and outboard supports extending therebetween.

4. The boom assembly of claim 1, wherein the winch assembly is positioned between the inboard end and the opposing outboard end of the boom housing whether in a retracted orientation or an extended orientation.

5. The boom assembly of claim 1, wherein the boom housing has a square cross-sectional shape and the longitudinal slot is located on a bottom side.

6. The boom assembly of claim 1, wherein the boom housing has a length and the telescoping boom has a length, and wherein the length of the telescoping boom is longer than the length of the boom housing.

7. The boom assembly of claim 1, wherein the connecting portion of the winch assembly has the form of a coupler.

8. The boom assembly of claim 1, wherein a length extending from a leading edge of the winch assembly to an outboard end of the boom housing is shorter with the telescoping boom in a second, extended orientation than a length extending from the leading edge of the winch assembly to an outboard end of the boom housing with the telescoping boom in a first, retracted orientation.

9. The boom assembly of claim 8, wherein with the telescoping boom in the first, retracted orientation, the winch assembly is closer to an inboard end of the boom housing than an outboard end of the boom housing.

10. The boom assembly of claim 9, wherein with the telescoping boom in the second, extended orientation, the winch assembly is closer to the outboard end of the boom housing than the inboard end of the boom housing.

11. A method of operating a boom assembly, comprising the steps of:
    extending a boom housing from a structure, vehicle, vessel or aircraft, the boom housing having a plurality of sides, the plurality of sides cooperating to define a longitudinal, internal cavity, the boom housing having an inboard end and an opposing outboard end;
    forming a longitudinal slot in one of the plurality of sides of the boom housing, the longitudinal slot extending from the inboard end to the opposing outboard end of the boom housing and fluidly connecting the longitudinal, internal cavity with exterior space;
    positioning a first end of a telescoping boom within the longitudinal, internal cavity defined by the plurality of sides of the boom housing and positioning an opposing second end outside the longitudinal, internal cavity defined by the plurality of sides of the boom housing, the telescoping boom configured for axial movement relative to the boom housing;
    connecting a winch assembly to the telescoping boom using a connecting portion extending through the longitudinal slot and configuring the winch assembly for axial movement relative to the boom housing in connection with axial movement of the telescoping boom, the axial movement of the winch assembly guided by the longitudinal slot;

connecting a first end of the winch cable to the winch assembly, the winch cable having a first portion extending from the winch assembly and arranged in a parallel orientation with the telescoping boom and a second portion; and fixing a pulley, separate and distinct from the winch assembly, to the second end of the telescoping boom, the pulley configured to receive the first portion of the winch cable extending from the winch assembly and further configured to support the second portion of the winch cable extending over the pulley in a direction away from the telescoping boom;

wherein the portion of the winch cable extending in an outward direction from the pulley has a length, and wherein the length of the portion of the winch cable extending in an outward direction from the pulley remaining the same regardless of the axial movement of the telescoping boom relative to the boom housing.

12. The method of claim 11, including the step of forming a swing arm assembly using the boom housing, the swing arm assembly configured for rotation about a bearing structure.

13. The method of claim 12, including the step of forming the swing arm assembly with a top support, the boom housing and a plurality of intermediate and outboard supports extending therebetween.

14. The method of claim 11, including the step of positioning the winch assembly between the inboard end and the opposing outboard end of the boom housing whether in a retracted orientation or an extended orientation.

15. The method of claim 11, including the step of locating the longitudinal slot on a bottom side of the boom housing.

16. The method of claim 11, wherein the boom housing has a length and the telescoping boom has a length, and wherein the length of the telescoping boom is longer than the length of the boom housing.

17. The method of claim 11 wherein the connecting portion of the winch assembly has the form of a coupler.

18. The method of claim 11, wherein a length extending from a leading edge of the winch assembly to an outboard end of the boom housing is shorter with the telescoping boom in a second, extended orientation than a length extending from the leading edge of the winch assembly to an outboard end of the boom housing with the telescoping boom in a first, retracted orientation.

19. The method of claim 18, wherein with the telescoping boom in the first, retracted orientation, the winch assembly is closer to an inboard end of the boom housing than an outboard end of the boom housing.

20. The method of claim 19, wherein with the telescoping boom in the second, extended orientation, the winch assembly is closer to the outboard end of the boom housing than the inboard end of the boom housing.

* * * * *